May 21, 1968 D. L. JONES ET AL 3,384,872

LOGIC DESIGN FOR A MAGNETIC-TAPE-TO-RADAR BUFFERING UNIT

Filed April 22, 1964 2 Sheets-Sheet 1

Inventors:
David L. Jones,
Sylvester C. Tabisz
BY Harry M. Saragovitz
Edward J. Kelly
Herbert Berl
Robert C. Sims

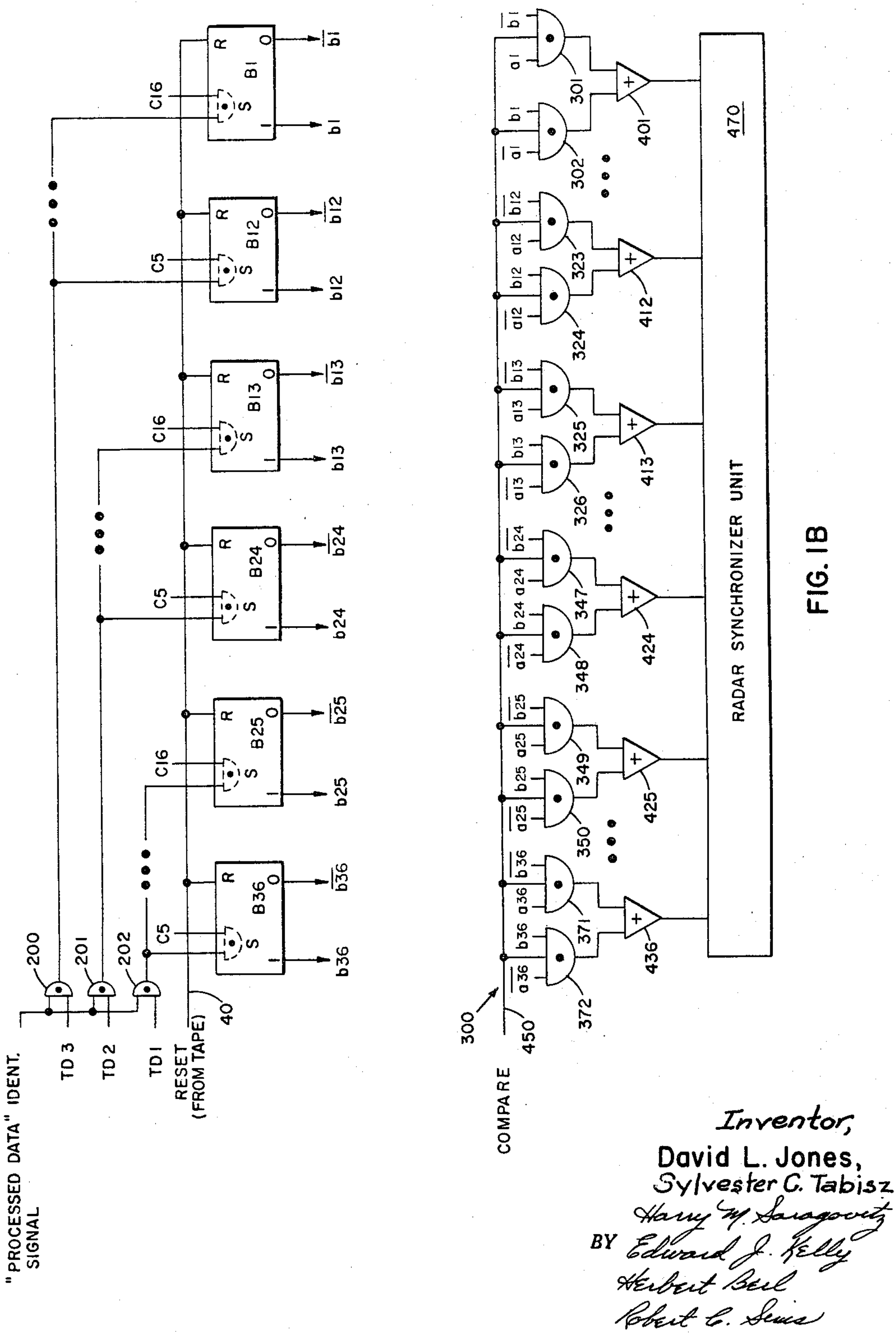
FIG. IB
Inventor,
David L. Jones,
Sylvester C. Tabisz
Harry M. Saragovitz
BY Edward J. Kelly
Herbert Berl
Robert C. Sims United States Patent Office 3,384,872

Patented May 21, 1968

3,384,872

LOGIC DESIGN FOR A MAGNETIC-TAPE-TO-RADAR BUFFERING UNIT

David L. Jones, Kensington, and Sylvester C. Tabisz, Baltimore, Md., assignors, by mesne assignments, to the United States of America as represented by the Secretary of the Army Filed Apr. 22, 1964, Ser. No. 361,919
3 Claims. (Cl. 340—146.2)

Figure 1A:
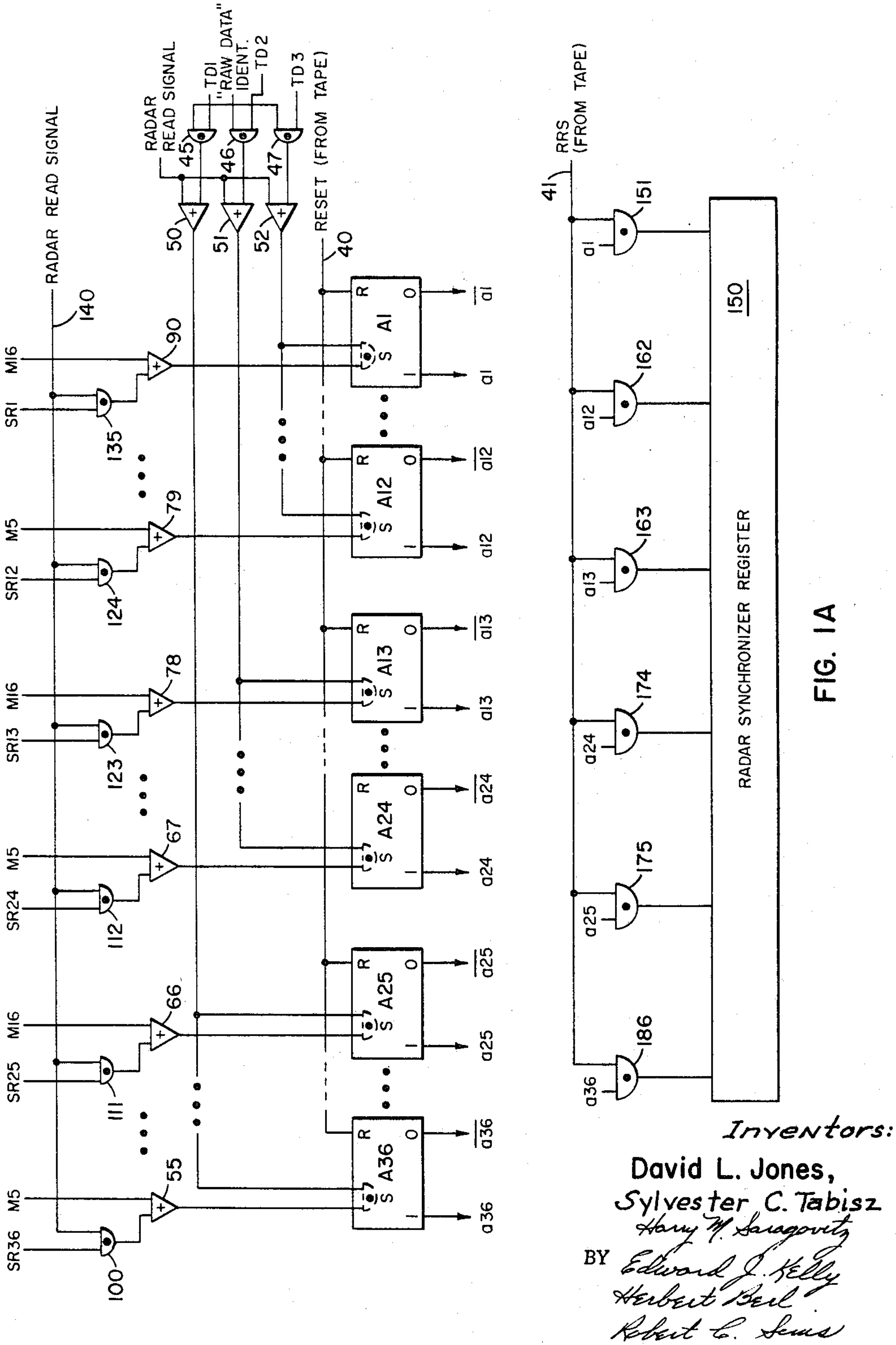

This invention relates generally to a test mode of operation whereby portions of radar equipment are operated from a program previously recorded on magnetic tape and checked to verify results. Specifically, pro-programmed "raw data," simulating inputs to radar, are read from 16-channel tape into a buffer register and fed into a radar Synchronizer Register in 36-bit words. The radar then processes the data and dumps the results back into a buffer register. Meanwhile, a second set of data from tape, consisting of computed predictions of radar results, will have been read into another buffer register, and upon a suitable signal, the contents of the two registers are compared and the result of the comparison, containing 1's in each bit position in which the contents of the two registers differ, are made available on 36 output lines.

In connection with a proposed synthetic spectrum radar system, to be built of Westinghouse G–40 Transistor Modules (see Westinghouse Electronics Division Advanced Development Report No. 108, 11, July 1959) the need arose for a test mode of operation whereby portions of the radar equipment could be operated from a program previously recorded on magnetic tape and checked to verify results.

For the sake of economy in space and materials, it was desired that this function be incorporated in the buffer unit that was to be provided for recording radar output on tape, since temporary storage registers and format control were already incorporated in this buffer unit.

It is an object of the present invention to provide a logic design suitable for use in a magnetic-tape-to-radar unit.

Another object of this invention is to provide a test mode of operation whereby portions of radar equipment can be operated from a program previously recorded on magnetic tape.

A still further object of this invention is to provide means to check the results of radar equipment operated from a program previously recorded on magnetic tape.

These and other objects and advantages of the present invention will become apparent from the following detailed description and from the accompanying drawings, in which FIGURES 1A and 1B combine to make a schematic diagram illustrating a preferred form of the present invention.

The invention may be better understood with reference to the drawings in which "raw data" (simulated radar input data) from a tape, not shown, is read into Register A of FIGURE 1A by way of lines M5–M16, TD1–TD3 and "raw data" identification. The tape is a 16-channel tape of which 12 channels contain 12 bit words. These words are fed into lines M5–M16. The other channels of the tape feed lines 40 and 41, and the inputs to AND gates 45–47. OR gates 50–52 have two inputs. One is connected to a radar read signal, and the other is connected to outputs of AND gates 45–47. An output from OR gate 50 is fed to one input of an AND gate set input of each of registers A25–A36. The three dots in FIGURES 1A and 1B represent a plurality of like elements with like connections. Outputs from OR gates 51 and 52 are similarly connected to registers A13–A24 and A1–A12 respectively.

Each of the inputs to AND gate set inputs of registers A25–A36 are connected to outputs of OR gates 55–66. The other set inputs of registers A13–A24 and A1–A12 are connected similarly to outputs of OR gates 67–68 and 79–90 respectively. Each OR gates 55–90 has two inputs; one connected to one of the lines M5–M16 and the other connected to line of the outputs of AND gates 100–135.

Each of AND gates 100–135 has one input connected to line 140. Line 140 is connected to receive a "radar read" signal. The other input of each of AND gates 100–135 is connected to one of the lines SR1–SR36. Lines SR1–SR36 are connected to outputs of a radar synchronizer register 150.

Registers A1–A36 each have a reset input R connected to reset line 40. Registers A1–A36 have outputs $a1$–$a36$ and $\overline{a1}$–$\overline{a36}$. When $a1$="1," $\overline{a1}$="0"; when $a2$ is "one" then $\overline{a2}$ is "zero"; etc. Outputs $a1$–$a36$ are connected to one input of AND gates 151–186 respectively. The other input of each of AND gates 151–186 is connected to line 41 to a signal RRS from the tape. The outputs of AND gates 151–186 are connected to a radar synchronizer register 150.

In FIGURE 1B a 36-bit block of computed data, consisting of predicted radar output, is read into register B by way of lines C5–C–16, processed data identification signal, lines TD1–TD3, and AND gates 200–202. Outputs from AND gate 200 are fed into one input of each of registers B1–B12. The outputs of AND gates 201 and 202 are fed into one input each of registers B13–B24 and B25–B36 respectively. Registers B1–B36 have outputs $b1$–$b36$ and $\overline{b1}$–$\overline{b36}$. When $b1$="one," $\overline{b1}$= "zero"; when $b1$="zero," $\overline{b1}$="one"; etc.

A comparison gating network 300 has AND gates 301–372 and OR gates have one input connected to line 450 to receive a compare signal from radar synchronizer unit 470. The other two inputs of these AND gates are connected to the outputs of Register A and Register B as is shown in FIGURE 1B. In other words $\overline{a36}$ input to AND gate 372 is connected to output $\overline{a36}$ of register A36; $b36$ input to AND gate 372 is connected to output $b36$ of register B36; etc. The outputs of AND gates 301 and 302 are connected to OR gate 401; the outputs of AND gates 303 and 304, not shown, are connected to the inputs of an OR gate 402 not shown; etc. OR gates 401–436 feed their output to radar synchronizer unit 470.

OPERATION

The first operation is to read "raw data" (simulated radar input data) from the channel tape having 12 data bits into the 36 data bit Register A. This is done by means of a set of three AND gates 45–47, each of which has as one input a "raw data" identification signal from the tape. The other input to each AND gate is one of three tape word identification signals; this insures that each word being read from the tape by lines M5–M16 is read into the proper twelve bit positions of the 36-bit register. Taped data and identification signals are so recorded that the first word (containing 12 data bits) is read into positions A25–A36; the second word into A13–A24; and the third word into A1–A12.

A signal from the tape ("RRS" in FIGURE 1A) flows through line 41 to open a bank of 36 output AND gates 151–186 to read the contents of Register A, 36 bits in parallel, into the radar Synchronizer Register. A reset signal from the tape will now send a signal along line 40 to clear Register A. At the same time this reset signal will be sent to clear Register B by way of line 40 into the reset side of registers B1–B36.

When a complete block of simulated input data has been read into the Synchronizer Register 150 and the radar equipment has processed the data, processed results are then read out of the Synchronizer Register back into Register A. This is done by a radar read signal on line 140 which will open AND gates 100–135, and applying the same radar read signal through OR gates 50–52 to open the set input of all the A registers. This will allow the processed results of the Synchronizer Register to flow from lines SR1–SR36, AND gates 100–135 and OR gates 55–90 to the other input of the set gate of registers A1–A36.

Meanwhile a 36 block of computed data, consisting of predicted radar output, is read into Register B; gated by a "processed data" identification signal and 12-bit-block identification signals from a tape in a manner similar to the loading of the simulated input data into the A register. This computed output data should correspond to the simulated radar input data.

Upon receipt of a "compare" signal from the radar Synchronizer Unit, the contents of Register A are compared with those of Register B by means of comparison gating network 300, and the result of the comparison is made available on a set of 36 lines to a radar Synchronizer Unit 470. The "compare" signal flows along line 450 to open AND gates 301–372 such that an unbarred output from Register A is combined with a barred output from Register B, and a barred output from Register A is combined with an unbarred output from Register B. In this manner, since both registers should have the same outputs, none of AND gates 301–372 should have an output. Therefore, there should be no output from OR gates 401–436. However, if one or more of the outputs of the registers differ one from the other, there will be an output from one of the AND gates. For example, assume that $a1$ should be a "one" but instead $\overline{a1}$ is the "one" output. In this case $b1$ will be a "one" and $\overline{b1}$ will be a "zero." Therefore, AND gate 301 will have two "zeros" and no output but AND gate 302 will have two "ones" (along with the "one" from line 450) and AND gate 302 will have an output. This output supplies a "one" input to radar Synchronizer Unit 470 by way of OR gate 401. Both registers A and B are now again cleared by a reset signal from the tape before being reloaded.

While the invention has been described with reference to a preferred embodiment thereof, it will be apparent that various modifications and other embodiments thereof will occur to those skilled in the art within the scope of the invention. Accordingly, we desire the scope of our invention to be limited only by the appended claims.

We claim:

1. A comparison system comprising: a first set of registers, each register including an output designated as logic "*a*" and a second output designated logic "not *a*," a two input AND gate set input and a reset input; a second set of registers, each register including an output designated as logic "*b*" and a second output designated as logic "not *b*"; a first gate network connected to an input of said set inputs of said first set of registers; a second gate network connected to the other input of said set inputs of said first set of registers; a synchronizer register; means for providing simulated radar input data; a plurality of AND gates equal in number to the number of registers in said first set of registers connecting said logic "*a*" outputs to inputs of said synchronizer register; a "read" signal line connected to an input of each of said AND gates; means for providing predicted output data as input data to said second set of registers; and means for comparing the outputs of said sets of registers for indicating any differences between the outputs of said first set of registers and said second set of registers.

2. A comparison system as set forth in claim 1, wherein said means for comparing comprises a plurality of sets of two AND gates equal in number to the number of registers in said first set of registers, and a plurality of OR gates equal in number to said sets of AND gates; means connecting the two outputs of each register of said first set of registers to different AND gates of a set; means connecting the two outputs of each register of said second set of registers to different AND gates of a set; and means connecting outputs of each of the AND gates to inputs of said OR gates.

3. A comparison system as set forth in claim 2, wherein said outputs of the registers are connected to the means for comparing so that outputs logic "*a*" are connected to the input of the AND gates to which outputs logic "not *b*" are connected; and outputs logic "not *a*" are connected to the AND gates to which outputs logic "*b*" are connected.

References Cited

UNITED STATES PATENTS

| | | | |
|---|---|---|---|
| 3,015,089 | 12/1961 | Armstrong | 340—172.5 |
| 3,030,609 | 4/1962 | Albrecht | 340—172.5 |
| 3,251,035 | 5/1966 | Weinstein | 340—172.2 |

OTHER REFERENCES

Richards R. K.: Arithmetic Operations in Digital Computers, pp. 383–384, February 1955.

MALCOLM A. MORRISON, *Primary Examiner.*

I. FAIBISCH, V. SIBER, *Assistant Examiners.*